US011571801B2

(12) United States Patent
Carrier et al.

(10) Patent No.: US 11,571,801 B2
(45) Date of Patent: Feb. 7, 2023

(54) FORCED AIR COOLING FROM PISTON MOVEMENTS OF NAILER TOOL

(71) Applicant: Kyocera Senco Industrial Tools, Inc.

(72) Inventors: Alexander L. Carrier, Cincinnati, OH (US); Christopher D. Klein, Cincinnati, OH (US)

(73) Assignee: Kyocera Senco Industrial Tools, Inc., Cincinnati, OH (US)

( * ) Notice: Subject to any disclaimer, the term of this patent is extended or adjusted under 35 U.S.C. 154(b) by 0 days.

(21) Appl. No.: 17/516,935

(22) Filed: Nov. 2, 2021

(65) Prior Publication Data

US 2022/0063075 A1    Mar. 3, 2022

Related U.S. Application Data

(63) Continuation of application No. 16/545,771, filed on Aug. 20, 2019, now Pat. No. 11,185,971.

(Continued)

(51) Int. Cl.
    *B25F 5/00*   (2006.01)
    *B25C 1/06*   (2006.01)
    (Continued)

(52) U.S. Cl.
    CPC .............. *B25F 5/008* (2013.01); *B25C 1/008* (2013.01); *B25C 1/04* (2013.01); *B25C 1/047* (2013.01);
    (Continued)

(58) Field of Classification Search
    CPC .. B25C 1/04; B25C 1/047; B25C 1/06; B25C 1/008; H02K 11/30; H02K 5/207; H02K 7/145
    See application file for complete search history.

(56) References Cited

U.S. PATENT DOCUMENTS

| 227,802 A | 5/1880 | Stanley |
| 472,972 A | 4/1892 | Appleby |
| (Continued) | | |

FOREIGN PATENT DOCUMENTS

| DE | 1510164 | 3/1970 |
| DE | 8711784 | 8/1987 |
| (Continued) | | |

OTHER PUBLICATIONS

Two-page "Tool Assembly" drawing of Senco Model No. SN952XP pneumatic tool; dated Mar. 4, 2008; representative of earlier tools used in public use before 2006; Admitted Prior Art.

(Continued)

*Primary Examiner* — Anna K Kinsaul
*Assistant Examiner* — Veronica Martin
(74) *Attorney, Agent, or Firm* — Frederick H. Gribbell; Russell F. Gribbell

(57)    ABSTRACT

A fastener driving tool that forces air from its variable venting volume beneath the piston of the working cylinder and directs that forced air through passageways and toward an electronic controller and/or an electric motor before being vented to atmosphere, thereby drawing heat away from those components during an operational cycle of the movable piston. When the piston returns to its initial position, environmental air is drawn through the same passageways, again past the electronic controller and/or electric motor, thereby twice cooling these "hot" components during a single operational cycle.

20 Claims, 8 Drawing Sheets

Related U.S. Application Data

(60) Provisional application No. 62/723,859, filed on Aug. 28, 2018.

(51) Int. Cl.
| | |
|---|---|
| *B25C 5/15* | (2006.01) |
| *B25C 1/04* | (2006.01) |
| *B25C 5/13* | (2006.01) |
| *B25C 1/00* | (2006.01) |
| *H02K 11/30* | (2016.01) |
| *H02K 5/20* | (2006.01) |
| *H02K 7/14* | (2006.01) |

(52) U.S. Cl.
CPC ............... *B25C 1/06* (2013.01); *B25C 5/13* (2013.01); *B25C 5/15* (2013.01); *H02K 5/207* (2021.01); *H02K 7/145* (2013.01); *H02K 11/30* (2016.01); *H02K 2205/09* (2013.01)

(56) References Cited

U.S. PATENT DOCUMENTS

| | | |
|---|---|---|
| 860,536 A | 7/1907 | Ellingham |
| 1,774,967 A | 9/1930 | Ellis |
| 2,575,455 A | 11/1951 | Lang |
| 2,814,041 A | 11/1957 | Haley |
| 2,933,290 A | 4/1960 | Ryder |
| 3,150,488 A | 9/1964 | Haley |
| 3,589,588 A | 6/1971 | Vasku |
| 3,847,322 A | 11/1974 | Smith |
| 3,878,902 A | 4/1975 | Matsuo |
| 4,203,353 A | 5/1980 | Bernham |
| 4,215,808 A | 8/1980 | Sollberger |
| 4,530,455 A | 7/1985 | Vornberger |
| 4,570,504 A | 2/1986 | Sitta |
| 4,741,518 A | 5/1988 | Wallis |
| 5,199,627 A | 4/1993 | Christensen |
| 5,503,319 A | 4/1996 | Lai |
| 5,557,905 A | 11/1996 | Cook |
| 5,595,251 A | 1/1997 | Cook |
| 5,605,268 A | 2/1997 | Hayashi |
| 5,720,423 A | 2/1998 | Kondo |
| 6,023,989 A | 2/2000 | Imase |
| 6,533,156 B1 | 3/2003 | Chang |
| 6,938,811 B2 | 9/2005 | Ehmig |
| 6,997,367 B2 | 2/2006 | Hu |
| 7,040,521 B2 | 5/2006 | Kolodziej |
| 7,225,961 B1 | 6/2007 | Lee |
| 7,225,962 B2 | 6/2007 | Porth |
| 7,494,036 B2 | 2/2009 | Shima |
| 8,011,547 B2 | 9/2011 | Leimbach |
| 8,267,297 B2 | 9/2012 | Leimbach |
| 2003/0218042 A1 | 11/2003 | Odoni |
| 2005/0082334 A1 | 4/2005 | Hu |
| 2005/0217875 A1 | 10/2005 | Forster |
| 2006/0180631 A1 | 8/2006 | Pedicini |
| 2007/0007319 A1 | 1/2007 | Simonelli |
| 2007/0045377 A1 | 3/2007 | Towfighi |
| 2008/0041914 A1 | 2/2008 | Simonelli |
| 2008/0067213 A1 | 3/2008 | Shima |
| 2008/0190986 A1 | 8/2008 | Chang |
| 2008/0190988 A1 | 8/2008 | Pedicini |
| 2011/0198381 A1* | 8/2011 | McCardle ............... B25C 1/047 227/8 |
| 2015/0352702 A1 | 12/2015 | Chien |
| 2017/0190037 A1 | 7/2017 | Sato |
| 2018/0126528 A1* | 5/2018 | Pomeroy ................. B25C 1/008 |
| 2018/0290279 A1* | 10/2018 | Kobori .................... B25C 1/047 |

FOREIGN PATENT DOCUMENTS

| | | |
|---|---|---|
| GB | 1559571 | 1/1980 |
| JP | 201308695 | 10/2013 |
| WO | 2016174994 | 11/2016 |

OTHER PUBLICATIONS

One-page magnified view of "Tool Asssembly" drawing of Senco Model No. SN952XP pneumatic tool; Mar. 4, 2008; representative of earlier tools in public use before 2006; Admitted Prior Art.
International Search Report, PCT/US2019/047289, 28 pages (dated Nov. 21, 2019).

* cited by examiner

FORCED AIR COOLING FROM PISTON MOVEMENTS OF NAILER TOOL

CROSS-REFERENCE TO RELATED APPLICATIONS

The present application is a continuation of application Ser. No. 16/545,771, titled "FORCED AIR COOLING FROM PISTON MOVEMENTS OF NAILER TOOL," filed on Aug. 20, 2019; and claims priority to provisional patent application Ser. No. 62/723,859, titled "FORCED AIR COOLING FROM PISTON MOVEMENTS OF NAILER TOOL," filed on Aug. 28, 2018.

TECHNICAL FIELD

The technology disclosed herein relates generally to fastener driving tools and is particularly directed to such tools of the type which use pressurized air to drive a piston that, in turn, causes a driver blade to force a fastener into a target workpiece. Embodiments are specifically disclosed which use the air "under" the movable piston, in a variable venting volume of the working cylinder, to force that air through passageways within the tool until reaching an electronic controller, so as to take heat away from that electronic controller, and to further force that air through vents or "outlets" to expel that air from the interior spaces of the tool, during a driving stroke of the piston.

Later, during a return stroke of the piston, environmental air is sucked in through those same vents, which now act as "inlets," and is drawn through the same passageways within the tool, which again forces air past the electronic controller, and thereby again takes heat away from that electronic controller. Therefore, air is forced past the electronic controller twice, during a single operational cycle of the movable piston of the working cylinder.

In a second embodiment fastener driving tool, the air from the variable venting volume of the working cylinder is further forced through a passageway into a motor housing and directed around and past the electric motor contained therewithin, and then further directed to a set of vents in the motor housing. Thus, in this second embodiment, the cooling air is forced past both the electronic controller and the electric motor to cool both of those heat-producing components, thereby drawing heat away from those components twice during a single operational cycle of the movable piston.

In a third embodiment fastener driving tool, the air from the variable venting volume of the working cylinder is forced through the motor housing where it is directed around and past the electric motor contained therewithin, and then further directed to a set of vents in the motor housing. The reciprocating movements of the piston in the working cylinder cause cooling air to be drawn past the motor twice during each operational cycle of the piston.

STATEMENT REGARDING FEDERALLY SPONSORED RESEARCH OR DEVELOPMENT

None.

BACKGROUND

Many conventional fastener driving tools use a piston to move a driver blade that forces a nail or staple into a target workpiece, as part of their operational cycle. These pistons are typically driven by compressed air, or in some cases, by combustion air. In a product line of pressurized air tools known as FUSION® that are sold by Senco, pressurized air is stored in a main storage chamber and that air is not vented to atmosphere, but instead is re-used multiple times, and can drive multiple driving strokes (including operational cycle counts in the thousands, per charge of pressurized air).

In the conventional tools, the air is that is "beneath" the movable piston in the working cylinder is exhausted to atmosphere. This air would otherwise be trapped under the piston, which would create a back-pressure that is undesirable for the workings of the tool. In these conventional tools, the air beneath the piston (in which that volume can be referred to as a "variable venting volume") is forced down toward a piston stop. That air is further directed through an opening in the piston stop and then through the base of the working cylinder, and finally through openings in the enclosure so that it is vented to atmosphere. Then, when the piston is "lifted" from its driven position back toward its ready position, environmental air is sucked back in through the same vents, through the same opening in the piston stop, and back into the variable venting volume beneath the piston. This reciprocating air is essentially wasted with regard to any other useful properties.

The FUSION® fastener driving tools that use the same pressurized air multiple times typically have an electronic controller and an electric motor that control the overall workings of the tool, and in the case of the motor, provides the motive force (as a prime mover) to lift the movable piston back toward its ready position after it has driven a fastener. These electrical and electronic components produce a good deal of heat, and for the most part, that heat is not "helped" to escape from the enclosure by any forced air movements. Such heat is essentially trapped inside the enclosure except for natural convection that allows some of the heat to escape through small vents in the housing that substantially encases the tool.

SUMMARY

Accordingly, it is an advantage to provide a way of forcing cooling air past the electronic controller and electric motor of a fastener driving tool so as to draw thermal energy away from those heat-producing components.

It is another advantage to provide a useful way of employing the air volume beneath the movable piston of a fastener driving tool, in which that air (in the "variable venting volume" of the working cylinder) is forced through passageways within the housing of the tool, and then directed toward the electronic controller so as to take heat away from the electronic controller, and then the air is directed out through vents to the atmosphere. This occurs during a driving stroke of the movable piston of the working cylinder, and then, during a return stroke, environmental air is sucked in through the same vents and forced past that same electronic controller where the moving air can again draw heat away from the electronic controller, and then move through the same passageways back into the variable venting volume beneath the piston of the working cylinder. In this manner, cooling air is twice forced past the electronic controller during a single operational cycle of the movable piston.

It is yet another advantage to provide a fastener driving tool in which the air in the variable venting volume beneath the piston of the working cylinder is directed through passageways within the housing of the tool, then past an electronic controller, and further past an electric motor before reaching vents where the air can escape to the atmosphere, and by doing so removes heat from the electronic controller and electric motor during a driving stroke of the movable piston. During a return stroke of that movable piston, environmental air is sucked through those same vents past the electric motor and past the electronic controller, through the same passageways back into the variable venting volume beneath the piston of the working cylinder. In this manner, cooling air is twice forced past both of those heat-producing components during a single operational cycle of the movable piston.

It is a yet further advantage to provide a fastener driving tool in which the air in the variable venting volume beneath the piston of the working cylinder is directed through passageways within the housing of the tool, then past an electric motor so as to take heat away from the electric motor, and then the air is directed out through vents to the atmosphere. This occurs during a driving stroke of the movable piston of the working cylinder, and then, during a return stroke, environmental air is sucked in through the same vents and forced past that same electric motor where the moving air can again draw heat away from the electric motor, and then move through the same passageways back into the variable venting volume beneath the piston of the working cylinder. In this manner, cooling air is twice forced past the electric motor during a single operational cycle of the movable piston.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a fastener driving tool is provided, which comprises: a cylinder that includes a movable piston, the cylinder including a variable displacement volume on a first side of the piston, and the cylinder including a variable venting volume on a second, opposite side of the piston; a driver that is in mechanical communication with the piston; a guide body that guides the driver, and that receives a fastener to be driven by the driver to an exit portion of the guide body; a lifter that is configured to move the driver from a driven position to a ready position; an electronic controller that includes at least one physical electronic hardware circuit; a housing that covers at least a portion of the cylinder and the guide body, and that covers at least a portion of the at least one physical electronic hardware circuit of the electronic controller; and an air passageway that extends at least between the variable venting volume and the at least one physical electronic hardware circuit of the electronic controller, and further extends to at least one vent in the housing to thereby provide a pneumatic communication with an outer environment.

In accordance with another aspect, a fastener driving tool, which comprises: a cylinder that includes a movable piston, the cylinder including a variable displacement volume on a first side of the piston, and the cylinder including a variable venting volume on a second, opposite side of the piston; a driver that is in mechanical communication with the piston; a guide body that guides the driver, and that receives a fastener to be driven by the driver to an exit portion of the guide body; a lifter that is configured to move the driver from a driven position to a ready position; a housing that covers at least a portion of the cylinder and the guide body; a motor housing that extends from a portion of the housing, and includes an electric motor that is configured to move the lifter; and an air passageway that extends at least between the variable venting volume and the electric motor, and further extends to at least one vent in the housing to thereby provide a pneumatic communication with an outer environment.

In accordance with yet another aspect, a fastener driving tool is provided, which comprises: a main storage chamber that contains a pressurized gas; a cylinder that includes a movable piston, the cylinder including a variable displacement volume on a first side of the piston that is in pneumatic communication with the main storage chamber, and the cylinder including a variable venting volume on a second, opposite side of the piston that is in pneumatic communication with an outer environment; a piston stop that is positioned on the second side of the movable piston, the piston stop exhibiting a through opening; a driver that is in mechanical communication with the piston; a guide body that guides the driver, and that receives a fastener to be driven by the driver to an exit portion of the guide body; a lifter that is configured to move the driver to move from a driven position to a ready position; an electronic controller that includes a processing circuit, a memory circuit, and an input/output interface circuit, the controller including at least one physical electronic hardware circuit; a main housing that covers at least a portion of the main storage chamber, the cylinder, and the guide body; a handle portion that extends from a first portion of the main housing, the handle portion including an enclosure that covers at least a portion of the at least one physical electronic hardware circuit of the electronic controller; at least one vent in the enclosure of the handle portion that is proximal to the at least one physical electronic hardware circuit of the electronic controller; a first air passageway that extends from the through opening of the piston stop to the enclosure of the handle portion; and a second air passageway that extends through the enclosure of the handle portion, between the first air passageway and the at least one vent in the handle portion.

In accordance with still another aspect, a fastener driving tool is provided, which comprises: a main storage chamber that contains a pressurized gas; a cylinder that includes a movable piston, the cylinder including a variable displacement volume on a first side of the piston that is in pneumatic communication with the main storage chamber, and the cylinder including a variable venting volume on a second, opposite side of the piston that is in pneumatic communication with an outer environment; a piston stop that is positioned on the second side of the movable piston, the piston stop exhibiting a through opening; a driver that is in mechanical communication with the piston; a guide body that guides the driver, and that receives a fastener to be driven by the driver to an exit portion of the guide body; a lifter that is configured to move the driver to move from a driven position to a ready position; an electronic controller that includes a processing circuit, a memory circuit, and an input/output interface circuit, the controller including at least one physical electronic hardware circuit; a main housing that covers at least a portion of the main storage chamber, the cylinder, and the guide body; a handle portion that extends from a first portion of the main housing, the handle portion including an enclosure that covers at least a portion of the at least one physical electronic hardware circuit of the electronic controller; an electronic motor that is configured to move the lifter; a motor housing that extends from a second portion of the main housing, and includes the electric motor; at least one vent in the motor housing; a first air passageway that extends from the through opening of the piston stop to the enclosure of the handle portion; and a second air passageway that extends through the enclosure of the handle portion, between the first air passageway and the bottom of the motor housing.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
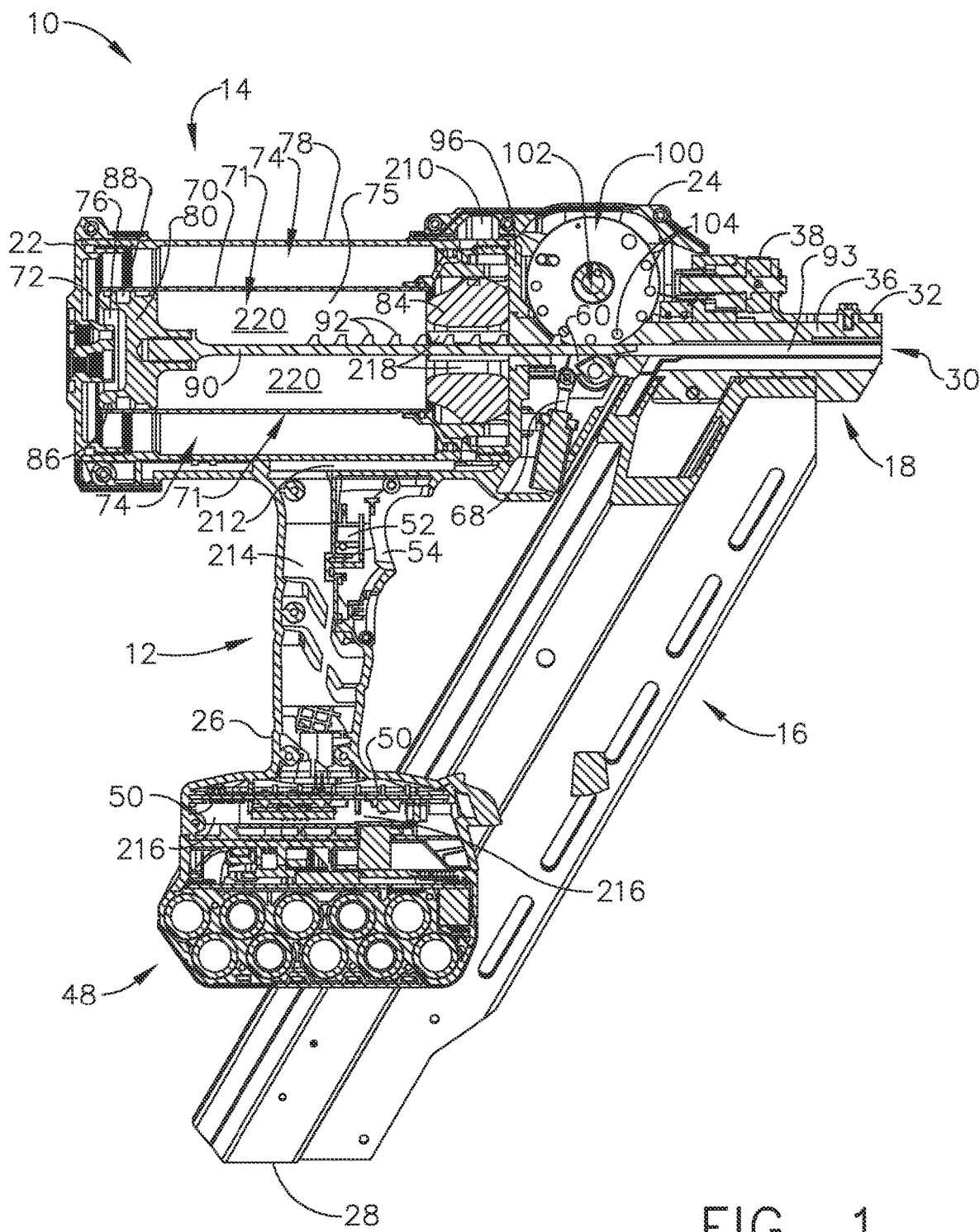
FIG. 1 is a cutaway side view showing the interior portions of a first embodiment fastener driving tool, constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Furthermore, the terms "communicating with" and "in communications with" refer to two different physical or virtual elements that somehow pass signals or information between each other, whether that transfer of signals or information is direct or whether there are additional physical or virtual elements therebetween that are also involved in that passing of signals or information. Moreover, the term "in communication with" can also refer to a mechanical, hydraulic, or pneumatic system in which one end (a "first end") of the "communication" may be the "cause" of a certain impetus to occur (such as a mechanical movement, or a hydraulic or pneumatic change of state) and the other end (a "second end") of the "communication" may receive the "effect" of that movement/change of state, whether there are intermediate components between the "first end" and the "second end," or not.

The terms "first" and "second" preceding an element name, e.g., first inlet, second inlet, etc., are used for identification purposes to distinguish between similar or related elements, results or concepts, and are not intended to necessarily imply order, nor are the terms "first" and "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein. Furthermore, if software is utilized, then the processing circuit that executes such software can be of a general purpose computer, while fulfilling all the functions that otherwise might be executed by a special purpose computer that could be designed for specifically implementing this technology.

It will be understood that the term "circuit" as used herein can represent an actual electronic circuit, such as an integrated circuit chip (or a portion thereof), or it can represent a function that is performed by a processing circuit, such as a microprocessor or an ASIC that includes a logic state machine or another form of processing element (including a sequential processing circuit). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

Referring now to FIG. 1, a first embodiment of a fastener driving tool is generally designated by the reference numeral 10. This tool 10 is mainly designed to linearly drive fasteners such as nails and staples. Tool 10 includes a handle portion 12, a fastener driver portion 14, a fastener magazine portion 16, and a fastener exit portion 18.

A "left" outer housing portion of the driver portion is indicated at 20. A "top" outer housing portion is indicated at 22, while a "front" outer housing portion of the driver portion is indicated at 24. A "rear" outer housing portion for the handle portion is indicated at 26, while a "rear" cover of the magazine portion is indicated at 28. It will be understood that the various directional nomenclature provided above is with respect to the illustration of FIG. 1, and the first embodiment fastener driving tool 10 can be used in many other angular positions, without departing from the principles of this technology.

The area of the tool 10 in which a fastener is released is indicated approximately by the reference numeral 30, which is the "bottom" of the fastener exit portion of tool 10. Before the tool is actuated, a safety contact element 32 extends to or beyond the bottom 30 of the fastener exit, and this extension of the safety contact element is the bottommost or "front" portion of the entire tool 10.

Other elements that are depicted in FIG. 1 include a guide body 36 and a depth of drive adjuster 38, which are in mechanical communication with the magazine portion 16.

Figure 5:
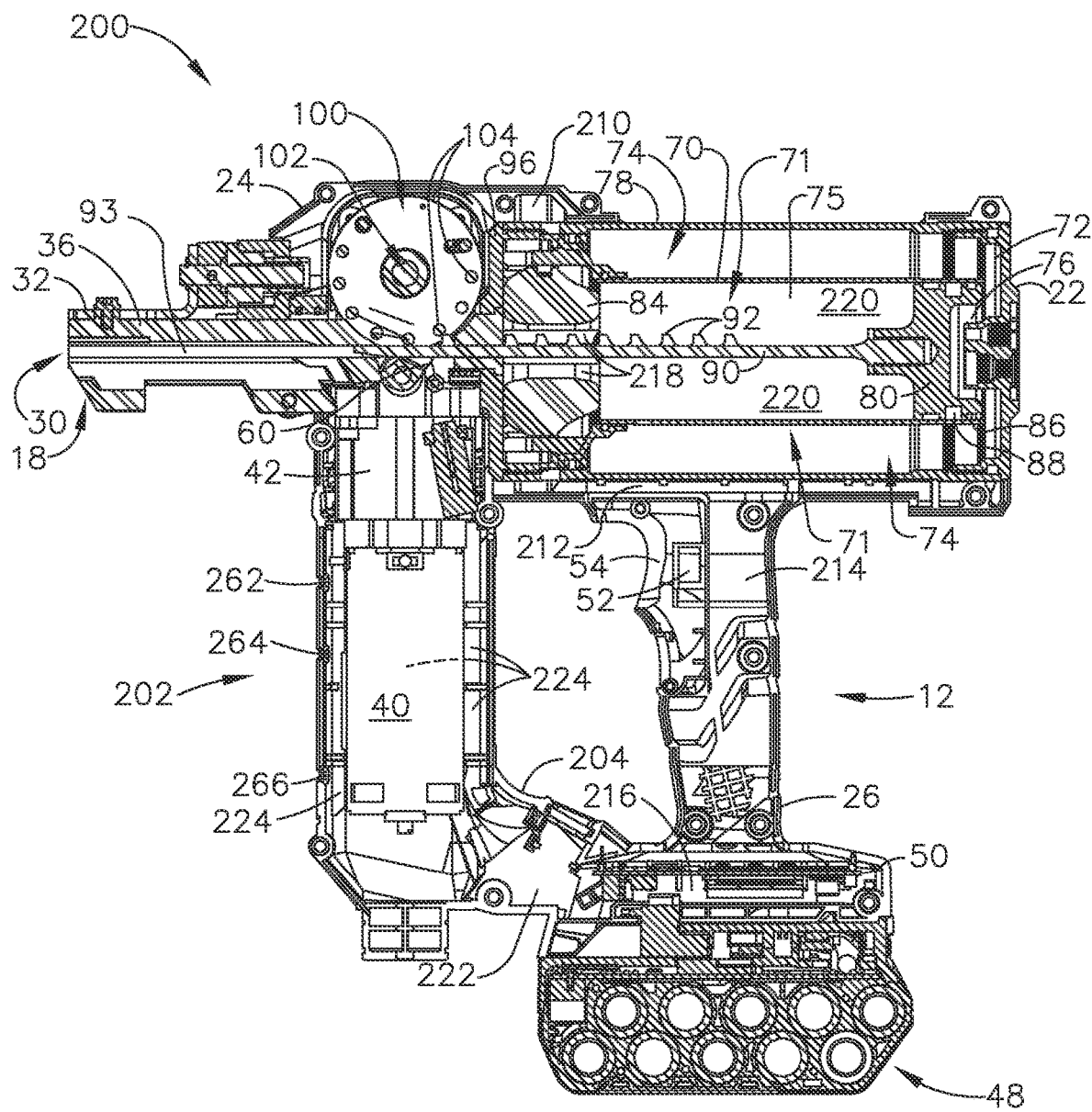
FIG. 5 is a cutaway side view showing the interior portions of a second embodiment fastener driving tool, constructed according to the principles of the technology disclosed herein.

The fastener driving tool 10 also includes a motor 40 (see FIG. 5) which acts as a prime mover for the tool, and which has an output that drives a gearbox 42 (see FIG. 5). An output shaft of the gearbox drives a gear train leading to a lifter drive shaft 102, and when the lifter drive shaft 102 rotates, a rotary-to-linear lifter 100 is actuated. A battery pack 48 is attached near the rear of the handle portion 12, and this battery provides electrical power for the motor 40 as well as for a control system. The motor 40 has a fan 46 that helps to cool the motor, when actuated.

A printed circuit board that contains a controller is generally designated by the reference numeral 50, and is placed within the handle portion 12 in this embodiment. A trigger switch 52 is activated by a trigger actuator 54. The handle portion 12 is designed for gripping by a human hand, and the trigger actuator 54 is designed for linear actuation by a person's finger while gripping the handle portion 12. Trigger switch 52 provides an input to the control system 50. There are also other input devices used with the system controller, however those input devices are not seen in FIG. 1.

Since FIG. 1 is a cutaway view of the tool 10, the printed circuit board shows the system controller 50 as it sits inside the handle portion 12 of the tool. The battery pack 48 is attached to the very back portion of the handle, just behind the printed circuit board 50. The tool's system controller will typically include a microprocessor or a microcomputer integrated circuit that acts as a processing circuit. At least one memory circuit will also typically be part of the controller, including Random Access Memory (RAM) and Read Only Memory (ROM) devices. To store user-inputted information (if applicable for a particular tool model), a non-volatile memory device would typically be included, such as EEPROM, NVRAM, or a Flash memory device.

The processing circuit communicates with external inputs and outputs, which it does by use of an input/output (I/O) interface circuit. The processing circuit, memory circuit, and the interface (I/O) circuit communicate with one another via a system bus, which carries address lines, data lines, and various other signal lines, including interrupts. The I/O circuit has the appropriate electronics to communicate with various external devices, including input-type devices, such as sensors and user-controlled switches, as well as output-type devices, such as a motor and indicator lamps. The signals between the I/O interface circuit and the actual input and output devices are carried by signal pathways, typically a number of electrical conductors.

Some of the output devices may include a lifter motor 40, a brake circuit (not shown), and a light emitting diode (not shown), which could potentially be replaced with an audio output device, such as a Sonalert. Each of the output devices will typically have a driver circuit, such as a motor driver circuit (not shown) for the lifter motor 40, and an interface driver (not shown) for the brake circuit. The position of a latch 60 is controlled by an electromechanical device, such as a solenoid or a motor, as desired by the system designer, and is actuated through a latch shaft 68.

The pivotable latch 60 presses against the driver member 90 under certain conditions. Latch 60 has an engagement extension that presses directly against one of the surfaces of the driver member 90 and, due to its physical configuration, the latch will allow the driver member to be raised upward (as seen in these views), but will not allow the driver member to be moved downward. As such, the latch 60 can act as a safety device in a first mode; and in a second mode, it also acts as a "release device" that allows the driver member to drive a fastener.

The LED would typically have an LED driver circuit (not shown), which could be a dual-direction driver circuit if the LED was a bi-directional device. Such a device might be desirable, and red and green LEDs are common devices, in which current in a first direction will produce a red indicator lamp signal, while reversing the current would produce a green indicator lamp signal.

The input devices for tool 10 can include various sensors, including a trigger switch 52 and a safety contact element switch (not shown). If such switches (including 52) are standard electromechanical devices (such as limit switches), then typically no driver circuit is necessary. However, if the trigger switch and safety element switch were to be replaced by solid state sensing elements, then some type of interface circuit could be needed.

The tool 10 may also include position sensors that can detect certain physical positions of a mechanical driver 90. These sensors may be referred to as an "UP sensor" (not shown), and a "DOWN sensor" (not shown). If provided, it is desired that these two sensors are "non-contact" devices, such as optical sensors; each one could have a light-emitting lamp (such as a LED) and a light-sensitive detecting element (such as a photodiode). Alternatively, these sensors could be magnetic sensing devices, such as Hall effect sensors, with a small permanent magnet affixed to the driver.

If provided, the UP and DOWN position sensors could to be located in small cylindrical areas near a driver track 93. The driver 90 of the illustrated embodiment includes several protruding teeth 92, which are used to contact "pins" 104 of the lifter 100. When the lifter rotates, physical contact between the driver teeth 92 and the lifter pins 104 causes the driver 90 to be "lifted" back toward its "ready" position, so that the next driving cycle can commence when the human user pulls the trigger 54 and also presses the bottom of the tool (at the safety contact element 32) against a target workpiece.

It should be noted that some of the sensors described herein are optional. The tool 10 can operated quite well without many of these sensors, including the UP and DOWN position sensors, which provide for an improved tool in many respects, but are not entirely necessary if one wishes to sell a lesser expensive tool, for example.

A working cylinder subassembly is designated by the reference numeral 71, and this is included as part of the fastener driver portion 14. On FIG. 2, the working cylinder 71 includes a cylinder wall 70, and within this cylinder wall 70 is a piston 80, and a stationary piston stop 84. Part of the piston mechanism of this embodiment includes a piston seal 86 and a piston guide ring 88. Surrounding, in the illustrated embodiment, the cylinder wall 70 is a main storage chamber 74 (also sometimes referred to herein as a "pressure vessel storage space") and an outer pressure vessel wall 78. At the top (to the left, as seen on FIG. 1) of the fastener driver portion 14 is a top cap 72 for the cylinder mechanism.

Also within the fastener driver portion 14 are mechanisms that will actually drive a fastener into a solid object. This includes the driver 90, a cylinder "venting chamber" 75 (which would typically always be at atmospheric pressure), the driver track 93, the rotary-to-linear lifter 100, and the latch 60. The driver 90 is also sometimes referred to herein as a "driver member" and the rotary-to-linear lifter 100 is also sometimes referred to herein as a "lifter member," or simply as a "lifter."

Driver 90 is rather elongated; the main body of its elongated face is substantially rectangular. There are multiple protrusions or "teeth" 92 that are positioned along the longitudinal edges of the driver. In the illustrated embodiment, these teeth 92 protrude in a transverse direction from the longitudinal centerline of driver 90, and they are spaced-apart from one another along the outer longitudinal edges of the driver 90. It will be understood that the precise positions for the teeth 92 could be different from those illustrated for the driver 90 without departing from the principles of the technology disclosed herein.

The latch 60 is designed to "catch" the driver 90 at times when the driver should not be allowed to move through an entire "driving stroke." The latch has a catching surface that can intercept a tooth 92 of the driver 90, when the latch is moved to its engaged, or "interfering" position. When a driving stroke is to occur, the latch is pivoted so that its catching surface is moved to its "disengaged" position, which is out of the way of the driver, and thus its catching surface will not interfere with any of the driver's teeth 92. An exemplary embodiment of such a latch is fully described in U.S. Pat. No. 8,011,441, owned by Senco Brands, Inc., which is incorporated herein by reference in its entirety.

There is a cylinder base 96 that mainly separates the gas pressure portions of the fastener driver portion 14 from the lower mechanical portions of that driver portion 14. The portion of the variable volume that is below the piston 80 is also referred to as a cylinder venting chamber 75, which is vented to atmosphere via a vent 250 near the cylinder base 96. The lower mechanical portions of driver portion 14 include a rotary-to-linear lifter 100 which was briefly mentioned above, along with a lifter drive shaft 102. Drive shaft 102 protrudes through the center portions of the fastener driver portion 14 and through the center of the lifter 100, and this shaft is used to rotate the lifter, as desired by the control system.

Figure 2:
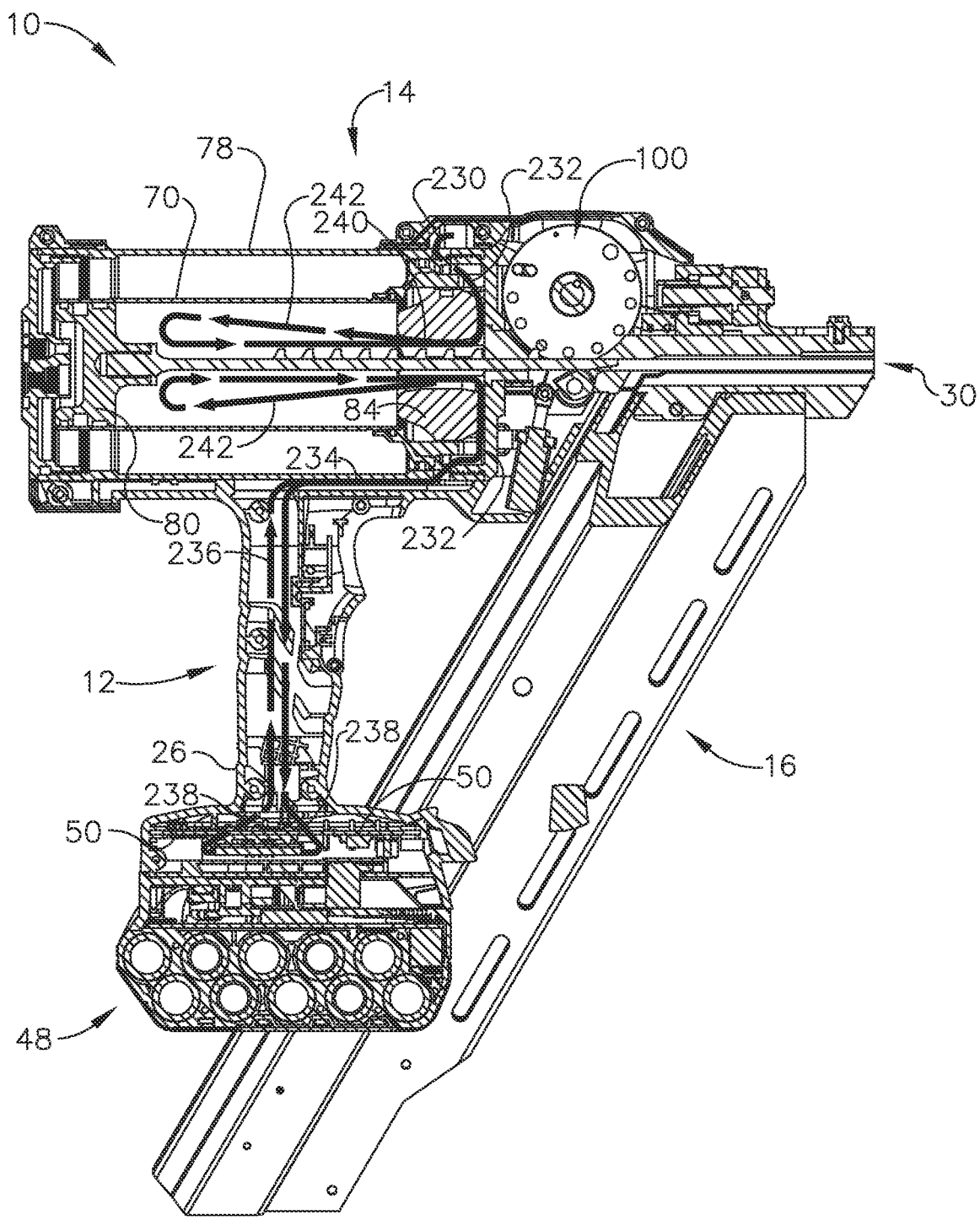
FIG. 2 is the same cutaway view as FIG. 1, but showing details of air flow patterns within the fastener driving tool of FIG. 1, as it operates.
Figure 3:
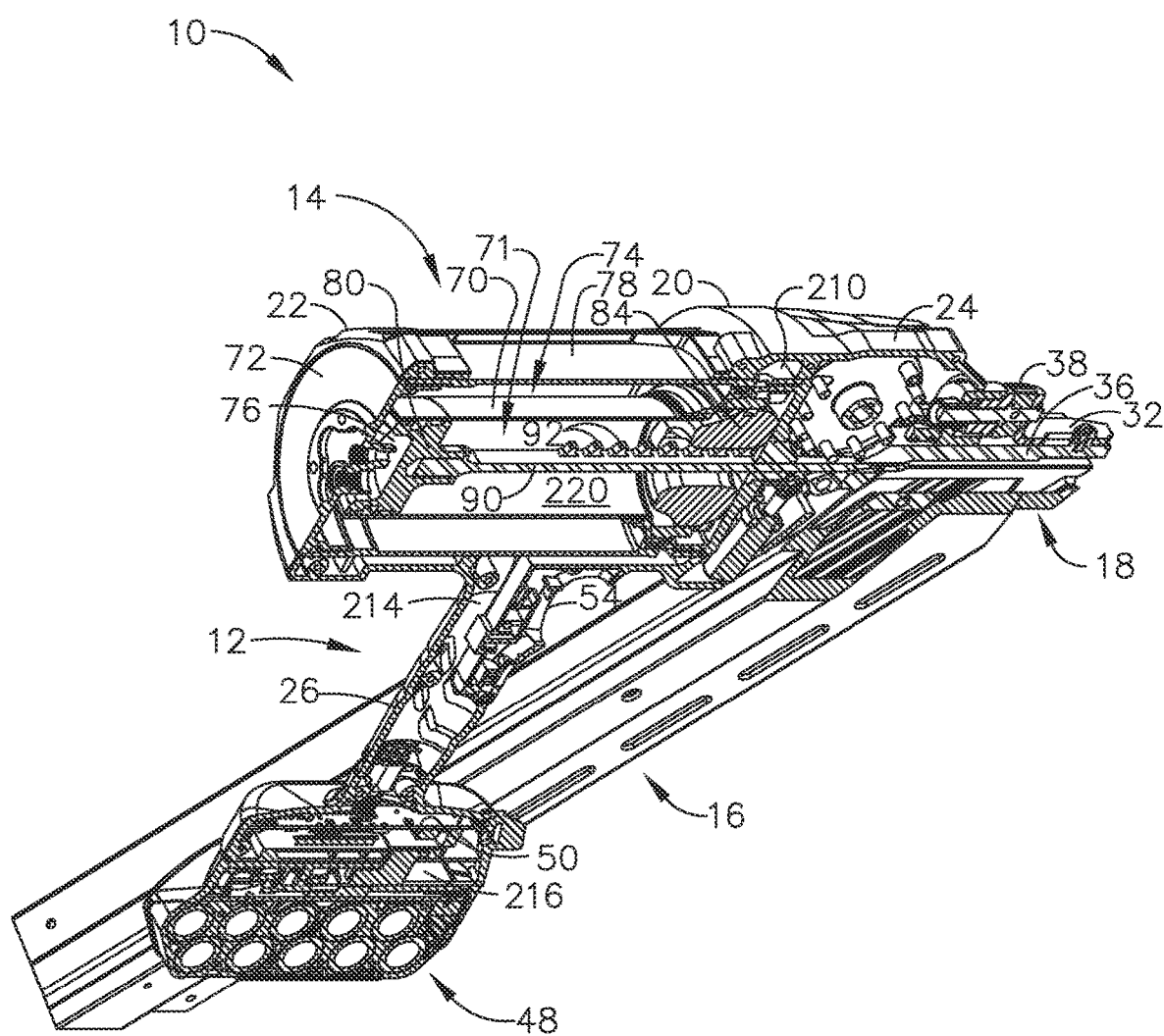
FIG. 3 is a perspective view from the side and above, in partial cut-away, of the fastener driving tool of FIG. 1.

In FIG. 1, the piston 80 is near or at its uppermost or top-most position, and a small gas pressure chamber 76 can be seen above the top-most area of the piston, above the piston seal 86. It will be understood that the gas pressure chamber 76 and the main storage chamber (or storage space) 74 are in fluidic communication with one another. It will also be understood that the portion to the interior of the cylinder wall 70 forms a displacement volume that is created by the stroke of the piston 80. In other words, the gas pressure chamber 76 is not a fixed volume, but this chamber will vary in volume as the piston 80 moves up and down (as seen in FIG. 2). This type of mechanical arrangement is often referred to as a "displacement volume," and that terminology will mainly be used herein for this non-fixed volume 76.

It will be further understood that the main storage chamber 74 preferably comprises a fixed volume, which typically would make it less expensive to manufacture; however, it is not an absolute requirement that the main storage chamber actually be of a fixed volume. It would be possible to allow a portion of this chamber 74 to deform in size and/or shape so that the size of its volume would actually change, during operation of the tool, without departing from the principles of the technology disclosed herein.

In the illustrated embodiment for the first embodiment fastener driving tool 10, the main storage chamber 74 substantially surrounds the working cylinder 71. Moreover, the main storage chamber 74 is annular in shape, and it is basically co-axial with the cylinder 71. This is a preferred configuration of the illustrated first embodiment, but it will be understood that alternative physical arrangements could be designed without departing from the principles of the technology disclosed herein.

There are certain "air passageways" in the first embodiment tool 10, which are illustrated in FIGS. 1-4. These air passageways are designed to channel cooling air throughout portions of the fastener driving tool so as to help cool certain rather hot components, including the electronic circuit board of the electronic controller 50. In the first embodiment depicted in FIGS. 1-4, some of the air passageways are as follows: an annular ring near the base of the piston stop is a passageway 210, a linear channel between the piston stop and the handle is a passageway 212, a somewhat linear channel in the handle that leads down toward the printed circuit board 50 is a passageway 214, spaces around the printed circuit board 50 and toward vents 260 comprise a rather large passageway 216. An opening or channel along the driver that runs through the middle of the piston stop is a passageway 218.

A rather large passageway 220 comprises the working cylinder's variable volume that is beneath the movable piston. This variable volume that is below the piston can also be referred to as a "variable venting volume" and essentially is always in communication with the outside environment where the fastener driving tool is operating. This is by design, of course, because the tool designer always desires to easily vent the air that is beneath the movable piston 80 at times when the piston is being used to drive a fastener into a workpiece, and therefore, that air volume needs to be allowed to vent to the atmosphere during that "driving stroke" portion of the operating cycle of the tool. Thereafter, when the movable piston is being "lifted" back up from its driven position toward its ready position, then environmental air needs to be allowed to flow back into that same variable venting volume 220 that is below the piston, so as to not create any type of vacuum that might otherwise create a back-pressure beneath the piston that may tend to inhibit that lifting motion. The displacement volume 76 is in fluidic (pneumatic) communication with the main storage chamber 74, as noted above. However, the variable venting volume 220 (see FIGS. 1 and 5) is not in fluidic (pneumatic) communication with this displacement volume 76—the two volumes are physically separated by the movable piston 80 (again, see FIGS. 1 and 5). This is a requirement in this design, because the variable venting volume 220 contains air that is ultimately vented to atmosphere, whereas the displacement volume 76 contains pressurized gas that must be maintained at a relatively high pressure for the fastener driving tool to operate. On the other hand, the variable venting volume 220 is in fluidic (pneumatic) communication with the various air passageways throughout the tool, such as the passageways 232 and 234 on FIG. 2, and the passageways 232 and 234 on FIG. 6. Thus, an air passageway that extends between the variable venting volume 220 and at least one vent in the housing, and also to at least one of the electric motor or the electronic hardware circuit, is not in pneumatic communication with the variable displacement volume of the cylinder. Furthermore, if the variable displacement volume 76 and the storage chamber 74 are said to comprise a "first gas system," and if a "second gas system" includes the variable venting volume 220 and an air passageway that extends between the variable venting volume and at least one vent in the housing, and also extends to at least one of the electric motor or the electronic hardware circuit, then it can be seen from viewing FIGS. 2 and 6 that the first gas system is pneumatically separated from the second gas system by the movable piston 80.

Figure 4:
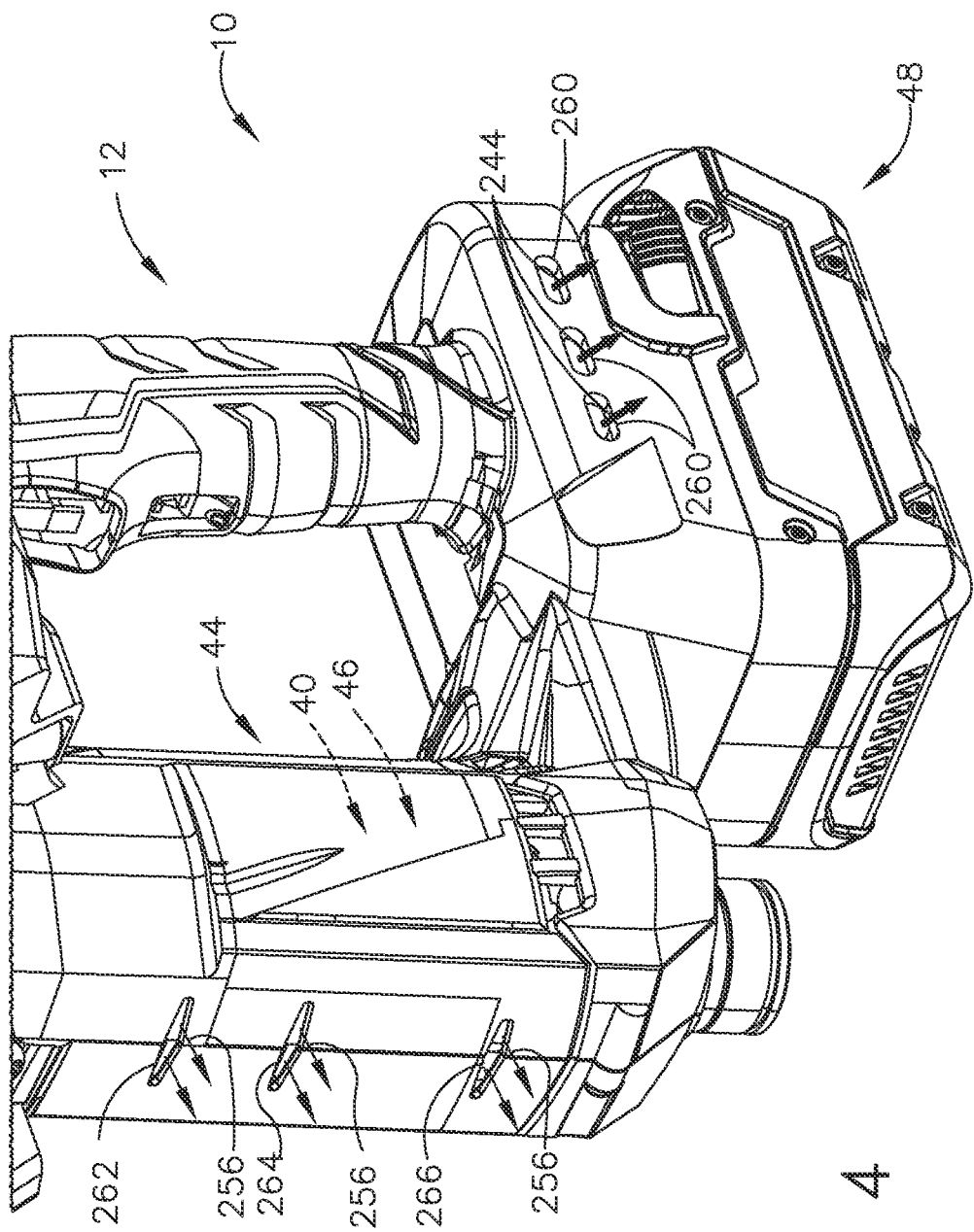
FIG. 4 is a side elevational view of the fastener driving tool of FIG. 1, showing portions of the tool near the battery pack.

In the first embodiment tool that is illustrated in FIGS. 1-4, there are several air vents that are illustrated in FIG. 4. A motor housing 44 is illustrated in FIG. 4, which was not seen in FIG. 1-3 for purposes of clarity. Along the "front" vertical side of the motor housing 44 are three air vents, designated by the reference numerals 262, 264, and 266. Cooling air produced by the motor fan 46 runs around the motor and out these three vents, thereby producing air flow paths at 256.

At the bottom of the handle 12, the enclosure (or housing) 26 widens in cross-sectional area to allow for the printed circuit board that contains the hardware circuitry of the electronic controller 50. This control circuit 50 not only contains intelligent electronics, such as that found in a microprocessor or a microcontroller, but also contains switching semiconductors that control the current and voltage being supplied to the motor 40, and therefore can run quite hot. There are several air vents 260 that are located along the side surfaces of this enclosure 26 that surrounds the electronic controller 50. There are air flow paths 244 that include cooling air that runs past the electronic controller 50 and run through these vents 260. It should be noted that these vents 260 and this cooling air 244 is quite separate from the cooling air that is supplied for the battery pack 48, which has an independent cooling system in and of itself.

Referring now to FIG. 2, a description of the air flow paths that run throughout the tool 10 will now be provided. It will be understood that movements of the piston 80 are at the heart of the operation of this fastener driving tool 10. When it is time to drive a fastener, certain actions by the human user will create an electrical signal that releases the piston 80 from being held in place by the lifter 100, and therefore, the piston will then move quickly from left to right in this view of FIG. 2. In previous embodiments of the FUSION® fastener driving tool sold by Senco, the volume of air "beneath" the piston that was within the working cylinder (also referred to herein as the "variable venting volume" of the working cylinder), would be moved through openings in the piston stop and then out vents in the housing or enclosure of the FUSION® tool, and then to the atmosphere. When the piston 80 was then "lifted" back toward its ready position, then air from the environment would then enter the same vents and through the piston stop and back into the working cylinder portion that is beneath the piston as that piston 80 was lifted from right to left in this view of FIG. 2.

Instead of merely venting that rather large volume of air, using the technology disclosed herein, that air will be used to cool the electronics of the first embodiment tool 10 that is illustrated in FIGS. 1-4. In FIG. 2, the air flow paths at 242 are initially pushed down (to the right in this view) and through an opening in the piston stop, which then becomes an air flow path 240. The moving air continues through an air flow path 230 that runs around an annular ring 210 that surrounds the exterior circumference of the piston stop. The air flow then continues to an air flow path 232 that runs through the linear channel 212, and then becomes an air flow path 234 that runs through the somewhat linear channel that is the interior volume of the handle 12.

The air flow then continues farther down until it impacts against and goes around the printed circuit board 50, and this is an air flow path 238. When this occurs, the air flow path 238 carries heat away from the printed circuit board 50, which is a very desirable effect. The air then continues movement and flows beneath the printed circuit board and through vents 260; these are air flow paths 244, as seen on FIG. 4. At this point, the air that has been evacuated by the driving stroke movements of the piston 80 have been directed through all these air passageways 210, 212, 214, 216, 218 and 220, and finally through the vents 244. When the piston 80 is later lifted toward its ready position, environmental air will then be sucked in through the vents 244 and through all the same air passageways just listed above, until making its way into the variable venting volume 220 beneath the piston, via the final air flow paths 242.

In this first embodiment of FIGS. 1-4, there are two separate sets of air passageways and air flow paths for cooling the fastener driving tool 10. The main cooling air is driven by the movements of the piston 80, and cools the electronics of the printed circuit board for the electronic controller 50, as just described above. There is also the motor fan 46 which creates a secondary air flow, using a separate set of vents and air flow paths that cool the motor 40; this is contained within the motor housing 44, and illustrated on FIG. 4.

Referring now to FIG. 5, a second embodiment of a fastener driving tool is generally designated by the reference numeral 200. As with the first embodiment 10, this second embodiment tool 200 is mainly designed to linearly drive fasteners such as nails and staples.

Tool 200 includes the same basic main components as that of the first embodiment tool 10, including a handle portion 12, a fastener driver portion 14, a fastener magazine portion 16, and a fastener exit portion 18. In fact, tool 200 essentially includes all of the same components that have been described above, in connection with the first embodiment tool 10.

Figure 6:
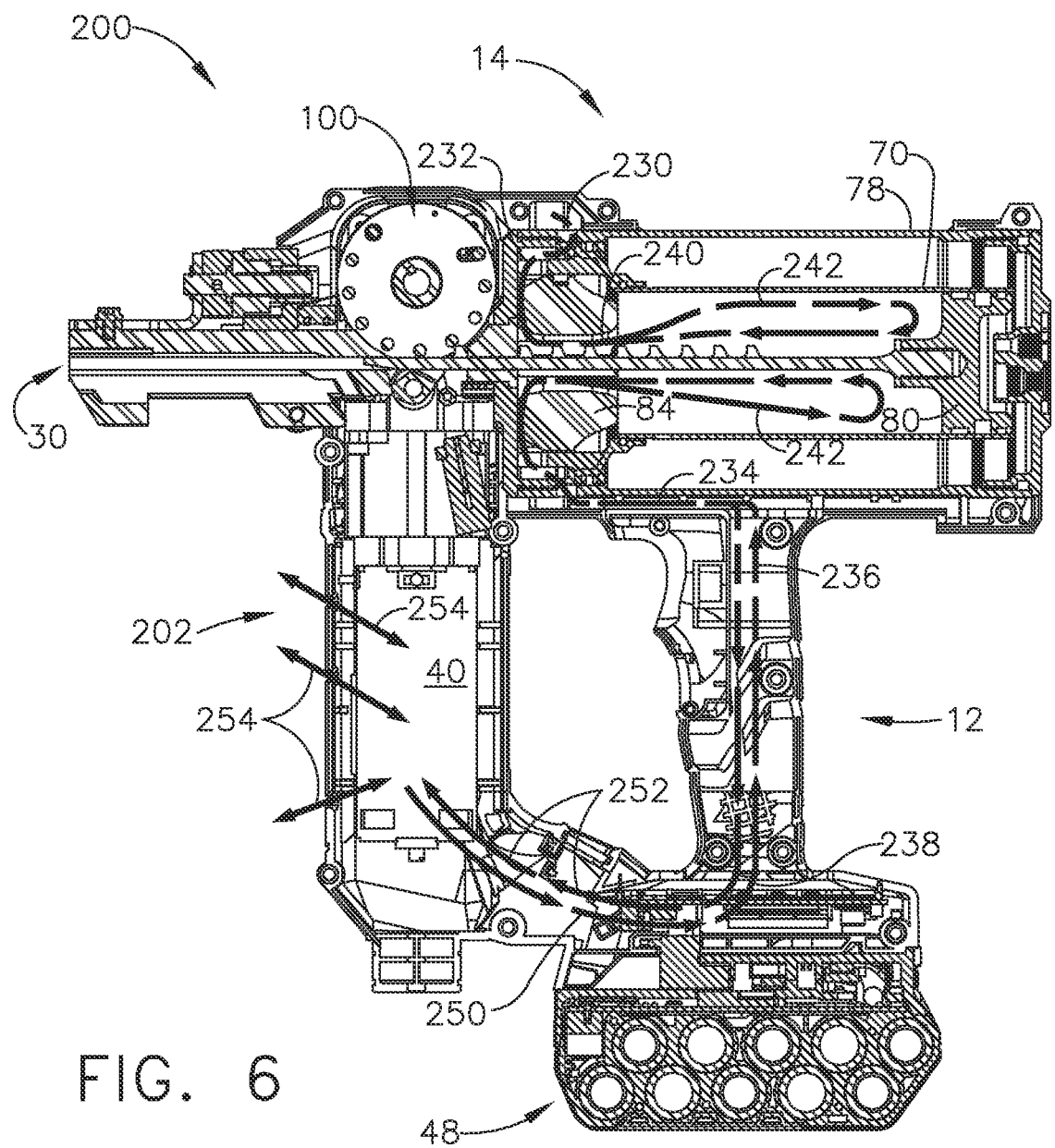
FIG. 6 is the same cutaway view as FIG. 5, but showing details of air flow patterns within the fastener driving tool of FIG. 5, as it operates.
Figure 7:
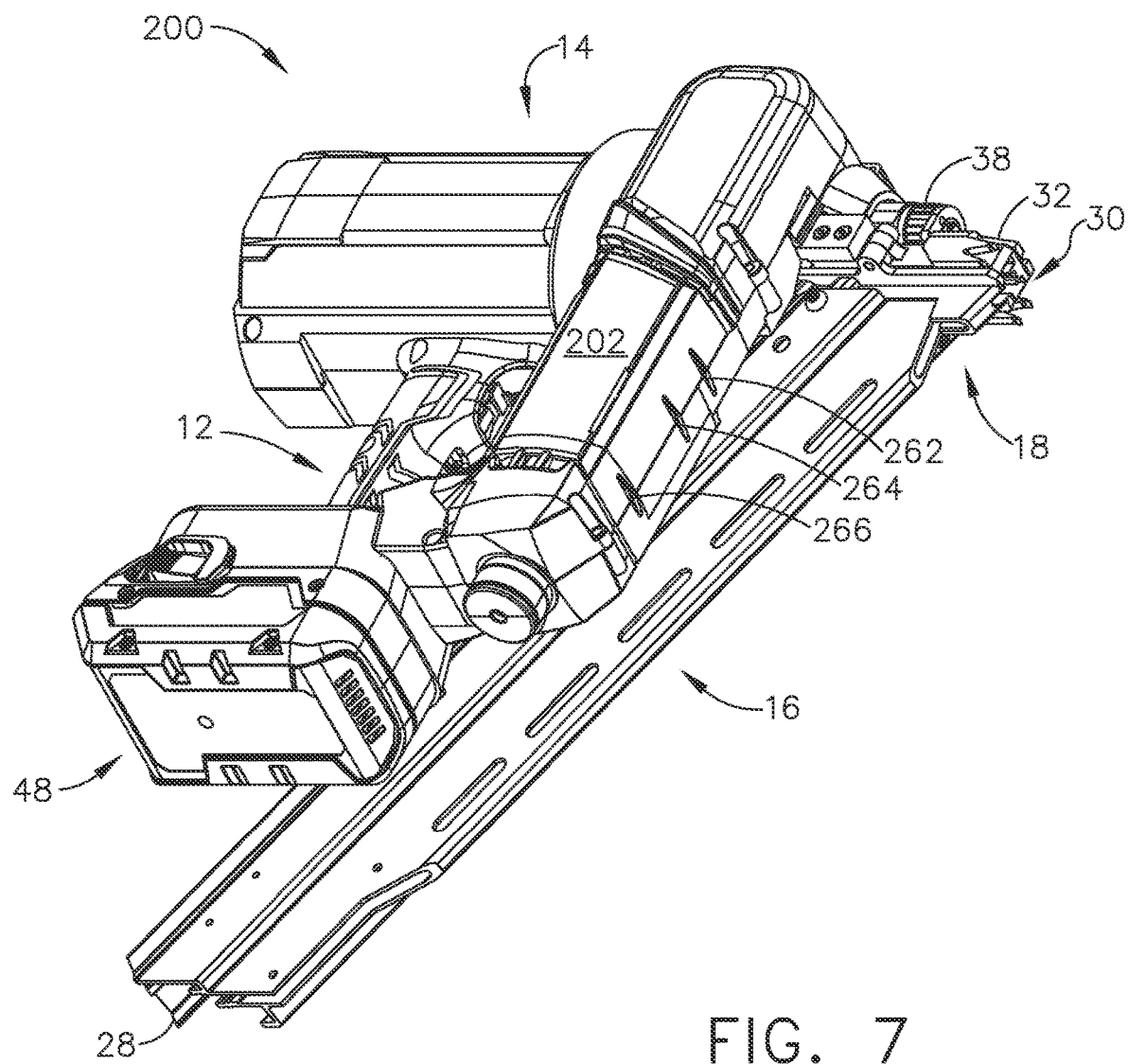
FIG. 7 is a perspective view from below and to the side, in partial cut-away, of the fastener driving tool of FIG. 5.

With respect to the drawings, FIGS. 5-7 show the motor housing portion of the tool 200, which is generally designated by the reference numeral 202. Therefore, the motor can be seen in these views, which is depicted at the reference numeral 40, and the gearbox is depicted at the reference numeral 42. These major components—the entire motor housing 202, along with its motor 40 and gearbox 42—are typically also included in the first embodiment tool 10, however, they were removed from certain drawings that illustrated that first embodiment tool (i.e., in FIGS. 1-3), for purposes of clarity. On the other hand, both FIGS. 1-3 of the first embodiment 10 and FIGS. 5-7 of the second embodiment 200 illustrate virtually all of the other components that have been described above, and thus, the above description of those components will equally apply to FIGS. 5-7, without having been repeated hereinbelow.

The major components of the first embodiment 10 of FIGS. 1-4 are quite similar to the second embodiment 200 that is illustrated in FIGS. 5-7. However, this second embodiment 200 includes a hollow connector 204 that runs between the lower handle 12 and the lower portion of the motor housing 202. In this instance, the connector 204 not only provides mechanical strength between the lower handle and the lower motor housing, but also provides an open volume that acts as an air passageway at 222. Another new air passageway for this second embodiment is depicted at 224, which represents spaces around the motor 40, so that air can flow around the major surfaces of the motor and then ultimately be vented out the several vents in the motor housing itself, which are depicted at the reference numerals 262, 264, and 266.

Referring now to FIG. 6, the air flow paths that are used by the second embodiment 200 will now be discussed in detail. As discussed above, it is the movements of the piston 80 that create an air flow beneath that piston (i.e., to the left in this view of FIG. 6) such that air in the variable venting volume that is beneath the piston 80 will be caused to be expelled from the interior portions of the tool 200 during a driving stroke, as the piston moves from its ready position toward its driven position against the piston stop 84. The first air flow path to be affected is illustrated at 242, which shows the air beneath the piston 80 being driven toward the piston stop. The next air flow path runs through the middle of the piston stop, and is indicated at the reference numeral 240. The air continues to flow to the next air flow path 230 which runs through the annular ring 210 that is near the base of the piston stop. The moving air continues through an air flow path 232 that runs from this annular ring to the linear channel 212, and then the air flow continues to an air flow path 236 that runs through the handle 12. The next air flow path is at 238, in which the moving air runs against and around the printed circuit board 50, and this event carries heat away from the printed circuit board having the electronic controller 50.

In the first embodiment illustrated in FIGS. 1-4, the next air flow path was at 244 which vented the air from beneath the printed circuit board and through the vents 260. However, in this second embodiment 200, there are no air vents 260, and therefore, the moving air is directed through the next air flow path 250 that runs beneath the printed circuit board, carrying additional heat away from the printed circuit board. Then the moving air is directed toward an air flow path 252 that runs through the connector 204 (through the open volume or air passageway 222). The moving air continues now to a series of air flow paths 254 that run around the motor 40 within the motor housing 202, and these air flow paths continue out through the vents 262, 264, and 266 that are in the vertical (in FIG. 5) side wall of the motor housing 202.

In the design of the second embodiment 200, the major air flow that is created by the driving stroke of the piston 80 causes air to be forced against and past the printed circuit board with the electronic circuit controller 50, thereby carrying heat away from that electronic device. That air flow continues around the motor 40, thereby carrying heat away from that rather hot device as well, finally exiting at the vents in the vertical side of the motor housing 202. (It will be understood that the term "vertical" side of the motor housing is with respect to the orientation viewed in FIGS. 5 and 6.) When the piston is lifted from its driven position back to its ready position, the environmental air will then be sucked back in through those same vents 262, 264, and 266, and will run through the same air flow paths in reverse order as just described above, to fill the variable venting volume 220 that is within the working cylinder 71 and below the piston 80, as that piston moves from left to right in the view of FIG. 6. It can be seen that the movements of the piston, which must take place under all circumstances for this fastener driving tool to produce any work at all, will now be used to provide a secondary benefit of cooling the hot electronics and the hot motor, and this cooling effect is essentially "free" because this air has to be channeled somewhere throughout the tool housing, and then vented to the atmosphere. As described above, that movable volume of air not only is exited from beneath the piston during a driving stroke, it is directed past the printed circuit board and the motor to cool those important devices and then, when the piston is lifted back "up" during a lifting stroke to its ready position, the air from the environment is then directed against and around the motor and the electronic circuit board once again, thereby producing a doubled cooling effect to create additional heat transfer away from those hot components.

Figure 8:
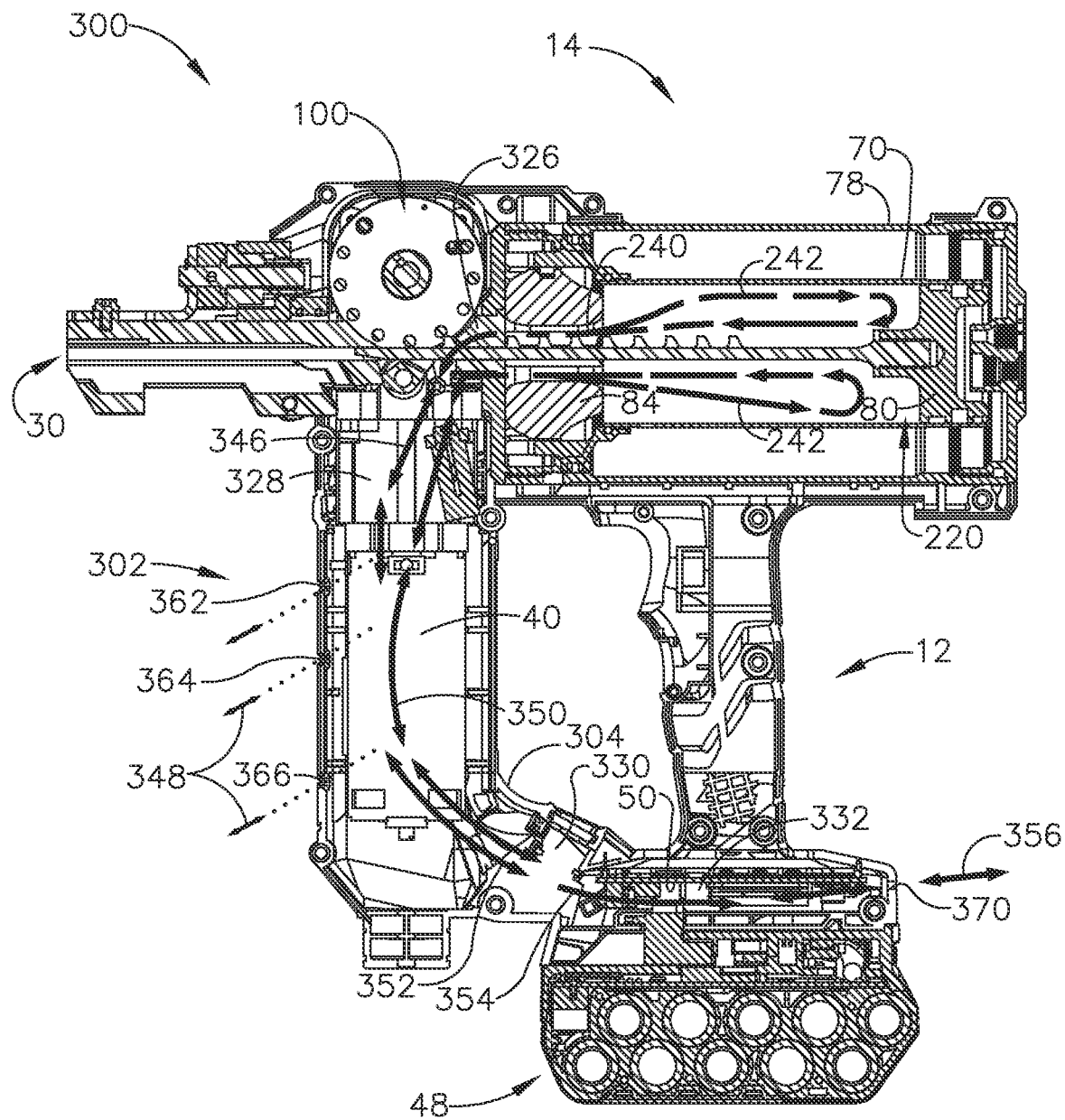
FIG. 8 is a cutaway side view showing the interior portions of a third embodiment fastener driving tool, constructed according to the principles of the technology disclosed herein.

Referring now to FIG. 8, a third embodiment of a fastener driving tool is generally designated by the reference numeral 300. As with the first embodiment 10, this third second embodiment tool 300 is mainly designed to linearly drive fasteners such as nails and staples.

Tool 300 includes the same basic main components as that of the first embodiment tool 10, including a handle portion 12, a fastener driver portion 14, a fastener magazine portion 16 (not shown on FIG. 8), and a fastener exit area 30. In fact, tool 300 essentially includes all of the same components that have been described above, in connection with the first embodiment tool 10.

With respect to the drawings, FIG. 8 shows the motor housing portion of the tool 300, which is generally designated by the reference numeral 302. Therefore, the motor can be seen in these views, which is depicted at the reference numeral 40, and the gearbox is depicted but not numbered. Note that FIGS. 1-3 of the first embodiment 10 and FIG. 8 of the third embodiment 300 illustrate virtually all of the other components that have been described above, and thus, the above description of those components will equally apply to FIG. 8, without having been repeated hereinbelow.

As in the second embodiment 200 that is illustrated in FIGS. 5-7, this third embodiment 300 includes a hollow connector 304 that runs between the lower handle 12 and the lower portion of the motor housing 302. In this instance, the connector 304 not only provides mechanical strength between the lower handle and the lower motor housing, but also provides an open volume that acts as an air passageway at 330. Another air passageway for this third embodiment is depicted at 328, which represents spaces within the upper portions of the motor housing.

A new air passageway for this third embodiment is depicted at 326, which is an opening or channel along the driver 90, through the middle of the working cylinder base. This air passageway 326 essentially extends the channel 218 along the driver (through the piston stop 84). On the opposite portion of the air passageways, there are spaces around the printed circuit board that includes the electronic controller 50; these spaces are generally referred to herein by the reference numeral 332.

FIG. 8 also illustrates the air flow paths that are used by the third embodiment 300, which will now be discussed in detail. As discussed above, it is the movements of the piston 80 that create an air flow beneath that piston (i.e., to the left in this view of FIG. 8) such that air in the variable venting volume 220 that is beneath the piston 80 will be caused to be expelled from the interior portions of the tool 300 during a driving stroke, as the piston moves from its ready position toward its driven position against the piston stop 84. The first air flow path to be affected is illustrated at 242, which shows the air beneath the piston 80 being driven toward the piston stop.

The next air flow path runs through the middle of the piston stop, and is indicated at the reference numeral 240. The air continues to flow to the next air flow path 346, which runs through the air passageway 326, and through the guide body and upper motor housing at 328. The moving air may now continue through some optional air flow paths 348 that lead to optional vents in the side wall of the motor housing 302, such as vents 362, 364, and 366. It should be noted that these optional air vents 362, 364, and 366 typically would only be used if the cooling air from the working cylinder 71 will not flow all the way to the electronic controller 50. On the other hand, if the tool's designer desires the cooling air from the working cylinder to flow all the way to the electronic controller 50, then optional air vents 362, 364, and 366 typically would not be used.

Assuming the cooling air flow is to continue to the electronic controller, then the air flow will continue to an air flow path 350 that runs through the motor housing 302, while flowing around the motor 40 and carrying heat from that motor. The next air flow path is at 352, which runs through the connector 304 between the bottom portions of the motor housing 302 and the handle 12. This moving air then continues to an air flow path at 354, in which the moving air runs against and around the printed circuit board 50, and this event carries heat away from the printed circuit board having the electronic controller 50.

The final air flow path is at 356, which flows through at least one vent 370 in the lower handle housing, as seen on FIG. 8. There can be multiple such vents 370, located at as many various positions around the housing that essentially surrounds the electronic controller 50 as desired by the tool's designer. Moreover, this could include vents located at the positions depicted on FIG. 4, for the vents 260.

In the design of the third embodiment 300, the major air flow that is created by the driving stroke of the piston 80 causes air to be forced against and past the printed circuit board with the electronic circuit controller 50, thereby carrying heat away from that electronic device. That air flow first flows around the motor 40, thereby carrying heat away from that rather hot device as well. This major air flow finally exits the tool's housing at vents near the electronic controller 50. In this manner, both the motor and the electronic components are cooled by this single major air flow. In essence, the design of this third embodiment accomplishes the same cooling of those major components, but in reverse order of "outlet" air flow.

When the piston is lifted from its driven position back to its ready position, the environmental air will then be sucked back in through those same vents 370, and will run through the same air flow paths in reverse order as just described above, to fill the variable venting volume 220 that is within the working cylinder 71 and below the piston 80, as that piston moves from left to right in the view of FIG. 8. It can be seen that the movements of the piston, which must take place under all circumstances for this fastener driving tool 300 to produce any work at all, will now be used to provide a secondary benefit of cooling the hot electronics and the hot motor, and this cooling effect is essentially "free" because this air has to be channeled somewhere throughout the tool housing, and then vented to the atmosphere. As described above, that movable volume of air not only is exited from beneath the piston during a driving stroke, it is directed past the motor and the printed circuit board to cool those important devices and then, when the piston is lifted back "up" during a lifting stroke to its ready position, the air from the environment is then directed against and around the electronic circuit board and the motor once again, thereby producing a doubled cooling effect to create additional heat transfer away from those hot components.

Optionally, as an alternative design that was noted above, the major air flow illustrated in FIG. 8 could run from the variable venting volume 220 past the motor, and then be vented at the motor housing, during a driving stroke of the piston 80. Then, during the return stroke, cooling (environmental) air would be sucked into through those same motor housing vents, past the motor, and then into the variable venting volume 220 below the piston 80. This would still achieve a doubled cooling effect, but it would affect only the motor, and not the electronic controller.

Note that some of the embodiments illustrated herein do not have all of their components included on some of the figures herein, for purposes of clarity. To see examples of such outer housings and other components, especially for earlier designs, the reader is directed to other U.S. patents and applications owned by Senco. Similarly, information about "how" the electronic controller operates to control the functions of the tool is found in other U.S. patents and applications owned by Senco. Moreover, other aspects of the present tool technology may have been present in earlier fastener driving tools sold by the Assignee, Kyocera Senco Industrial Tools, Inc., including information disclosed in previous U.S. patents and published applications. Examples of such publications are patent numbers U.S. Pat. Nos. 6,431,425; 5,927,585; 5,918,788; 5,732,870; 4,986,164; 4,679,719; 8,011,547, 8,267,296, 8,267,297, 8,011,441, 8,387,718, 8,286,722, 8,230,941, and 8,763,874; also published U.S. patent application No. 2016/0288305 and published U.S. patent application, No. 2018/0178361. These documents are incorporated by reference herein, in their entirety.

It will be understood that the electronic controller 50 includes sufficient circuitry so as to be an intelligent device, including a processing circuit, a memory circuit that includes instructions executable by said processing circuit, and an input/output (I/O) interface circuit that sends and receives signals to sense certain input conditions of the tool, and to command certain active devices to perform their intended functions. The associated drawings do not show these electronic circuits, but they are disclosed in some of the patents listed above, and thus incorporated by reference. More specifically, the electronic controller 50 is configured to send and receive signals: (a) to determine an operating state of the electric motor 40; (b) to determine an operating state of a trigger switch and a safety contact switch (not specifically illustrated in these drawings); (c) to cause the piston 80 to move from its ready position to its driven position, under first predetermined conditions; and (d) to actuate the motor to cause the lifter 100 to move the piston from the driven position to the ready position, under second predetermined conditions.

The above "first predetermined conditions" include the actuation of the trigger 54 by a human user, and the actuation of a safety contact element that occurs when the human user presses the front end of the tool (at portion 18) against a target workpiece. The above "second predetermined conditions" occur when the piston has undergone a driving stroke and has arrived at its driven position—which would be at the piston stop 84. In a typical Senco FUSION tool, the electronic controller 50 will now automatically engage the motor 40 to turn the lifter 100 to move the piston back through a return stroke to its ready position. These "second predetermined conditions" can also include a safety circuit to detect whether or not the motor 40 has entered into a locked rotor condition; if that event was detected, then the electronic controller 50 would probably stop its control signal to activate the motor 40, so that the motor would not overheat.

It will be further understood that any type of product described herein that has moving parts, or that performs functions (such as computers with processing circuits and memory circuits), should be considered a "machine," and not merely as some inanimate apparatus. Such "machine" devices should automatically include power tools, printers, electronic locks, and the like, as those example devices each have certain moving parts. Moreover, a computerized device that performs useful functions should also be considered a machine, and such terminology is often used to describe many such devices; for example, a solid-state telephone answering machine may have no moving parts, yet it is commonly called a "machine" because it performs well-known useful functions.

Additionally, it will be understood that a computing product that includes a display to show information to a human user, and that also includes a "user operated input circuit" so the human user is able to enter commands or data, can be provided with a single device that is known as a "touchscreen display." In other words, if a patent claim recites a "display" and a "user operated input circuit" as two separate elements, then a single touchscreen display, in actually, is exactly the same thing. It should be noted that a touchscreen display usually includes a virtual keypad, and therefore, a "user operated input circuit" typically comprises a virtual keypad, particularly on smart phones and on tablet computers. Moreover, in this situation, the word "virtual" means that it is not a hardware keypad; more specifically, "virtual" means that it is formed (i.e., "created") on the display screen because of software being executed by a processing circuit.

As used herein, the phrase "physical electronic hardware circuit" refers to any type of electronic circuit in any physical form, including purely electrical or electronic components, and including such electrical/electronic components that are combined with other types of devices, such as magnetic components and optical components, and of course, including interface components such as LEDs and photosensing devices, like optocouplers that either receive or send "light" signals through the air or through optical fibers. In general, a "physical electronic hardware circuit" will typically include some type of processing circuit or other type of logic circuit that can be used to control a tool or other device, and if a processing circuit includes a true microprocessor or microcontroller, then there typically will be a memory circuit that is either built into the same IC chip (such as in a microcontroller) or that is constructed as a separate IC chip, but that communicates with the processing circuit.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal" Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A fastener driving tool, comprising:
   a cylinder that includes a movable piston that moves in a reciprocating pattern during an operating cycle, said cylinder including a variable displacement volume on a first side of said piston, and said cylinder including a variable venting volume on a second, opposite side of said piston;

a storage chamber that is in fluidic communication at all times with said variable displacement volume of the cylinder, said storage chamber being charged with a pressurized gas;

a driver that is in mechanical communication with said piston;

a guide body that guides said driver, and that receives a fastener to be driven by said driver to an exit portion of the guide body;

a lifter that is configured to move said driver from a driven position to a ready position;

an electronic controller that includes at least one physical electronic hardware circuit;

a housing that covers at least a portion of said cylinder and said guide body, and that covers at least a portion of said at least one physical electronic hardware circuit of the electronic controller;

(a) a first gas system that includes:
  (i) said variable displacement volume of the cylinder, and
  (ii) said storage chamber,
said pressurized gas within said first gas system causing said movable piston to move through a drive stroke toward said driven position, wherein said pressurized gas is not vented to atmosphere after said drive stroke, but instead said pressurized gas is re-used for a plurality of said operating cycles; and (b) a second gas system that includes:
  (i) said variable volume of the cylinder,
  (ii) an air passageway that extends between said variable venting volume and said at least one physical electronic hardware circuit of the electronic controller, and
  (iii) said air passageway further extends to at least one vent in said housing to thereby provide a pneumatic communication with an outer environment;
wherein said first gas system is pneumatically separated from said second gas system by said movable piston.

2. The fastener driving tool of claim 1, wherein: said at least one vent is proximal to said at least one physical electronic hardware circuit of the electronic controller.

3. The fastener driving tool of claim 2, wherein:
(a) the reciprocating motion of said movable piston causes air to move through said variable venting volume, through said air passageway, and through said at least one vent in said housing; and
(b) said moving air passes around and cools said at least one physical electronic hardware circuit of the electronic controller.

4. The fastener driving tool of claim 1, further comprising:
(a) an electric motor that is configured to move said lifter; and
(b) a motor housing that extends from a portion of said housing, and includes said electric motor.

5. The fastener driving tool of claim 4, wherein:
(a) said air passageway further extends between said at least one physical electronic hardware circuit of the electronic controller and said electric motor; and
(b) said at least one vent is proximal to said electric motor.

6. The fastener driving tool of claim 5, wherein:
(a) the reciprocating motion of said movable piston causes air to move through said variable venting volume, through said air passageway, and through said at least one vent in said housing; and (b) said moving air passes around and cools both:
  (i) said at least one physical electronic hardware circuit of the electronic controller, and
  (ii) said electric motor.

7. A fastener driving tool, comprising:
a cylinder that includes a movable piston that moves in a reciprocating pattern during an operating cycle, said cylinder including a variable displacement volume on a first side of said piston, and said cylinder including a variable venting volume on a second, opposite side of said piston;

a storage chamber that is in fluidic communication at all times with said variable displacement volume of the cylinder, said storage chamber being charged with a pressurized gas;

a driver that is in mechanical communication with said piston;

a guide body that guides said driver, and that receives a fastener to be driven by said driver to an exit portion of the guide body;

a lifter that is configured to move said driver from a driven position to a ready position;

a housing that covers at least a portion of said cylinder and said guide body;

a motor housing that extends from a portion of said housing, and includes an electric motor that is configured to move said lifter; and (a) a first gas system that includes:
  (i) said variable displacement volume of the cylinder, and
  (ii) said storage chamber,
said pressurized gas within said first gas system causing said movable piston to move through a drive stroke toward said driven position, wherein said pressurized gas is not vented to atmosphere after said drive stroke, but instead said pressurized gas is re-used for a plurality of said operating cycles; and (b) a second gas system that includes:
  (i) said variable volume of the cylinder,
  (ii) an air passageway that extends between said variable venting volume and said electric motor, and
  (iii) said air passageway further extends to at least one vent in said housing to thereby provide a pneumatic communication with an outer environment;
wherein said first gas system is pneumatically separated from said second gas system by said movable piston.

8. The fastener driving tool of claim 7, wherein: said at least one vent is proximal to said electric motor.

9. The fastener driving tool of claim 8, wherein:
(a) the reciprocating motion of said movable piston causes air to move through said variable venting volume, through said air passageway, and through said at least one vent in said housing; and
(b) said moving air passes around and cools said electric motor.

10. The fastener driving tool of claim 7, further comprising:
(a) an electronic controller that includes at least one physical electronic hardware circuit; and
(b) said housing covers at least a portion of said at least one physical electronic hardware circuit of the electronic controller.

11. The fastener driving tool of claim 10, wherein:
(a) said air passageway further extends between said electric motor and said at least one physical electronic hardware circuit of the electronic controller; and (b) said at least one vent is proximal to said at least one physical electronic hardware circuit of the electronic controller.

12. The fastener driving tool of claim 11, wherein:
(a) the reciprocating motion of said movable piston causes air to move through said variable venting volume, through said air passageway, and through said at least one vent in said housing; and
(b) said moving air passes around and cools both:
   (i) said at least one physical electronic hardware circuit of the electronic controller, and
   (ii) said electric motor.

13. A fastener driving tool, comprising:
a cylinder that includes a movable piston, said cylinder including a variable displacement volume on a first side of said piston, and said cylinder including a variable venting volume on a second, opposite side of said piston;
a driver that is in mechanical communication with said piston;
a guide body that guides said driver, and that receives a fastener to be driven by said driver to an exit portion of the guide body;
a lifter that is configured to move said driver from a driven position to a ready position;
an electronic controller that includes at least one physical electronic hardware circuit;
a housing that covers at least a portion of said cylinder and said guide body, and that covers at least a portion of said at least one physical electronic hardware circuit of the electronic controller; and
an air passageway that extends between said variable venting volume and said at least one physical electronic hardware circuit of the electronic controller, and further extends to at least one vent in said housing to thereby provide a pneumatic communication with an outer environment;
wherein: said air passageway is not in pneumatic communication with said variable displacement volume of the cylinder.

14. The fastener driving tool of claim 13, wherein: said at least one vent is proximal to said at least one physical electronic hardware circuit of the electronic controller.

15. The fastener driving tool of claim 13, further comprising:

(a) an electric motor that is configured to move said lifter; and
(b) a motor housing that extends from a portion of said housing, and includes said electric motor.

16. The fastener driving tool of claim 15, wherein: said at least one vent is proximal to said electric motor, and said air passageway further extends between said electric motor and said at least one physical electronic hardware circuit of the electronic controller.

17. A fastener driving tool, comprising:
a cylinder that includes a movable piston, said cylinder including a variable displacement volume on a first side of said piston, and said cylinder including a variable venting volume on a second, opposite side of said piston;
a driver that is in mechanical communication with said piston;
a guide body that guides said driver, and that receives a fastener to be driven by said driver to an exit portion of the guide body;
a lifter that is configured to move said driver from a driven position to a ready position;
a housing that covers at least a portion of said cylinder and said guide body;
a motor housing that extends from a portion of said housing, and includes an electric motor that is configured to move said lifter; and
an air passageway that extends between said variable venting volume and said electric motor, and further extends to at least one vent in said housing to thereby provide a pneumatic communication with an outer environment;
wherein: said air passageway is not in pneumatic communication with said variable displacement volume of the cylinder.

18. The fastener driving tool of claim 17, wherein: said at least one vent is proximal to said electric motor.

19. The fastener driving tool of claim 17, further comprising: an electronic controller that includes at least one physical electronic hardware circuit, wherein said housing covers at least a portion of said at least one physical electronic hardware circuit of the electronic controller.

20. The fastener driving tool of claim 19, wherein: said at least one vent is proximal to said at least one physical electronic hardware circuit of the electronic controller, and said air passageway further extends between said electric motor and said at least one physical electronic hardware circuit of the electronic controller.

* * * * *